United States Patent [19]

Chung et al.

[11] Patent Number: 5,744,429

[45] Date of Patent: *Apr. 28, 1998

[54] MIXED ETHYLENE ALPHA OLEFIN COPOLYMER MULTIFUNCTIONAL VISCOSITY MODIFIERS USEFUL IN LUBE OIL COMPOSITIONS

[75] Inventors: David Yen-Lung Chung, Edison, N.J.; Paul Brice, Abingdon; Steven James Searis, Wantage, both of England; Mark Joseph Struglinski, Bridgewater; John Brooke Gardiner, Mountainside, both of N.J.

[73] Assignee: Exxon Chemical Patents Inc, Linden, N.J.

[*] Notice: The term of this patent shall not extend beyond the expiration date of Pat. No. 5,427,702.

[21] Appl. No.: 671,563

[22] Filed: Jun. 27, 1996

Related U.S. Application Data

[62] Division of Ser. No. 414,074, Mar. 31, 1995, abandoned, which is a division of Ser. No. 989,418, Dec. 11, 1992, Pat. No. 5,427,702.

[51] Int. Cl.$^6$ .................... C10M 149/06; C10M 133/52
[52] U.S. Cl. .................... 508/221; 508/232; 508/454; 508/223
[58] Field of Search .................... 508/221, 232, 508/241, 464, 454, 223

[56] References Cited

U.S. PATENT DOCUMENTS

| | | |
|---|---|---|
| 3,697,429 | 10/1972 | Engel et al. . |
| 3,779,928 | 12/1973 | Schlicht . |
| 3,852,205 | 12/1974 | Kablaoui et al. . |
| 3,879,306 | 4/1975 | Kablaoui et al. . |
| 3,932,290 | 1/1976 | Koch et al. . |
| 3,933,659 | 1/1976 | Lyle et al. . |
| 4,028,258 | 6/1977 | Kablaoui et al. . |
| 4,033,889 | 7/1977 | Kiovsky . |
| 4,089,794 | 5/1978 | Engel et al. . |
| 4,105,571 | 8/1978 | Shaub et al. . |
| 4,134,927 | 1/1979 | Tomoshige et al. . |
| 4,160,739 | 7/1979 | Stambaugh et al. . |
| 4,161,452 | 7/1979 | Stambaugh et al. . |
| 4,169,063 | 9/1979 | Kiovsky . |
| 4,176,074 | 11/1979 | Coupland et al. . |
| 4,235,731 | 11/1980 | Kiovsky . |
| 4,320,019 | 3/1982 | Hayashi . |
| 4,344,853 | 8/1982 | Gutierrez et al. . |
| 4,357,250 | 11/1982 | Hayashi . |
| 4,505,834 | 3/1985 | Papay et al. . |
| 4,507,515 | 3/1985 | Johnston et al. .......................... 585/12 |
| 4,517,104 | 5/1985 | Bloch et al. . |
| 4,735,736 | 4/1988 | Chung . |
| 4,780,228 | 10/1988 | Gardiner et al. . |
| 4,839,074 | 6/1989 | Rossi et al. . |
| 4,863,623 | 9/1989 | Nalesnik . |
| 4,877,557 | 10/1989 | Kaneshige et al. . |
| 4,921,625 | 5/1990 | Gorman et al. . |
| 4,986,924 | 1/1991 | Germanaud et al. . |
| 5,035,821 | 7/1991 | Chung et al. . |
| 5,055,213 | 10/1991 | Germanaud et al. . |
| 5,068,047 | 11/1991 | Chung et al. . |
| 5,073,600 | 12/1991 | Gorman et al. .......................... 525/264 |
| 5,075,383 | 12/1991 | Migdal et al. .......................... 525/293 |
| 5,102,566 | 4/1992 | Fetterman, Jr. et al. . |
| 5,112,508 | 5/1992 | DeRosa et al. . |
| 5,139,688 | 8/1992 | Nalesnik . |
| 5,160,446 | 11/1992 | Nalesnik et al. . |
| 5,162,086 | 11/1992 | Migdal et al. . |
| 5,238,588 | 8/1993 | Nalesnik et al. . |
| 5,427,702 | 6/1995 | Chung et al. . |

FOREIGN PATENT DOCUMENTS

| | | |
|---|---|---|
| 1114096 | 12/1981 | Canada . |
| 1184554 | 3/1985 | Canada . |
| 0295853 | 12/1988 | European Pat. Off. . |
| 0307132 | 3/1989 | European Pat. Off. . |
| 0400866 | 12/1990 | European Pat. Off. . |
| 0440506 | 8/1991 | European Pat. Off. . |
| WO94/13763 | 6/1994 | WIPO . |

OTHER PUBLICATIONS

Article from Encyclopedia of Chemical Technology, "Ethylene Amines" (Kirk and Othmer), vol. 5, pp. 898–905, Interscience Publishers, New York (1950). (Month Unknown).

*Primary Examiner*—Alan Diamond

[57] ABSTRACT

The present invention relates to novel multifunctional viscosity modifiers comprising a mixture of derivatized ethylene-alpha olefin copolymers, A and B. Said A copolymer comprising from about 30 to about 60 weight percent monomer units derived from ethylene and said B copolymer comprising from about 60 to about 80 weight percent units derived from ethylene.

19 Claims, 3 Drawing Sheets

FIG. 4

| growth | initial | 1 week | 2 weeks | 4 weeks | 6 weeks | 8 weeks | % weeks |
|---|---|---|---|---|---|---|---|
| Base Case | 783 | 830 | 884 | 945 | 998 | 1008 | 28.7 |
| Base Case plus 3 wt.% dispersant | 700 | 702 | 700 | 716 | 740 | 746 | 6.6 |

MIXED ETHYLENE ALPHA OLEFIN COPOLYMER MULTIFUNCTIONAL VISCOSITY MODIFIERS USEFUL IN LUBE OIL COMPOSITIONS

This is a divisional of application Ser. No. 414,074, filed Mar. 31, 1995 now abandoned, which is a Rule 60 Divisional of U.S. Ser. No. 989,418 filed Dec. 11, 1992 now U.S. Pat. No. 5,427,702.

BACKGROUND OF THE INVENTION

FIELD OF THE INVENTION

This invention relates to Multifunctional Viscosity Modifier (MFVM) additives for petroleum oils particularly lubricating oils, their functionalized intermediates, and methods for making both.

Multigrade lubricating oils typically are identified by two numbers such as 10W30, 5W30 etc. The first number in the multigrade designation is associated with a maximum low temperature (e.g.,–20° C.) viscosity requirement for that multigrade oil as measured typically by a cold cranking simulator (CCS) under high shear, while the second number in the multigrade designation is associated with a minimum high temperature (e.g., 100° C.) viscosity requirement. Thus, each particular multigrade oil must simultaneously meet both strict low and high temperature viscosity requirements in order to qualify for a given multigrade oil designation. Such requirements are set e.g., by ASTM specifications. By "low temperature" as used herein is meant temperatures of typically from about –30° to about –5° C. By "high temperature" as used herein is meant temperatures of typically at least about 100° C.

The minimum high temperature viscosity requirement, e.g., at 100° C., is intended to prevent the oil from thinning out too much during engine operation which can lead to excessive wear and increased oil consumption. The maximum low temperature viscosity requirement is intended to facilitate engine starting in cold weather and to ensure pumpability, i.e., the cold oil should readily flow or slump into the well for the oil pump, otherwise the engine can be damaged due to insufficient lubrication.

In formulating an oil which efficiently meets both low and high temperature viscosity requirements, the formulator may use a single oil of desired viscosity or a blend of two lubricating oils of different viscosities, in conjunction with manipulating the identity and amount of additives that must be present to achieve the overall target properties of a particular multigrade oil including its viscosity requirements.

The natural viscosity characteristic of a lubricating oil is typically expressed by the neutral number of the oil (e.g., S150N) with a higher neutral number being associated with a higher natural viscosity at a given temperature. In some instances the formulator will find it desirable to blend oils of two different neutral numbers, and hence viscosities, to achieve an oil having a viscosity intermediate between the viscosity of the components of the oil blend. Thus, the neutral number designation provides the formulator with a simple way to achieve a desired base oil of predictable viscosity. Unfortunately, merely blending oils of different viscosity characteristics does not enable the formulator to meet the low and high temperature viscosity requirements of multigrade oils. The formulator's primary tool for achieving this goal is an additive conventionally referred to as a viscosity index improver (i.e., V.I. improver).

A monofunctional V.I. improver is conventionally an oil-soluble long chain polymer. A multifunctional VI improver (MFVI or alternately MFVM) is an oil soluble polymer which has been chemically modified e.g., functionalized and derivatized to impart dispersancy as well as viscosity modification. The large size of the polymers of the MFVI enables them to significantly increase Kinematic viscosities of base oils even at low concentrations. However, because solutions of high polymer containing MFVI's are non-Newtonian, they tend to give lower viscosities than expected in a high shear environment due to the alignment of the polymer. Consequently, MFVI's impact (i.e., increase) the low temperature viscosities (i.e., CCS viscosity) of the base oil to a lesser extent than they do the high temperature viscosities. Accordingly, constraints are placed on the amount of V.I. improver which a formulator can employ for a given oil blend in order to meet the low and high temperature viscosity requirements of a target multigrade oil.

The aforesaid viscosity requirements for a multigrade oil can therefore be viewed as being increasingly antagonistic at increasingly higher levels of MFVI. For example, if a large quantity of MFVI is used in order to obtain high viscosity at high temperatures, the oil may now exceed the low temperature requirement. In another example, the formulator may be able to readily meet the requirement for a 10W30 oil but not a 5W30 oil, with a particular ad-pack (additive package) and base oil. Under these circumstances the formulator may attempt to lower the viscosity of the base oil, such as by increasing the proportion of low viscosity oil in a blend, to compensate for the low temperature viscosity increase induced by the V.I. improver, in order to meet the desired low and high temperature viscosity requirements. However, increasing the proportion of low viscosity oils in a blend can in turn lead to a new set of limitations on the formulator, as lower viscosity base oils are considerably less desirable in diesel engine use than the heavier, more viscous oils.

Further complicating the formulator's task is the effect that dispersant additives can have on the viscosity characteristics of multigrade oils. Dispersants are frequently present in quality oils such as multigrade oils, together with the V.I. improver. The primary function of a dispersant is to maintain oil insolubles, resulting from oxidation during use, in suspension in the oil thus preventing sludge flocculation and precipitation. Consequently, the amount of dispersant employed is dictated and controlled by the effectiveness of the material for achieving its dispersant function. A typical U.S. Service Station commercial oil contains four times as much dispersant as V.I. improver (as measured by the respective dispersant and V.I. improver active ingredients). In addition to dispersancy, conventional dispersants can also increase the low and high temperature viscosity characteristics of a base oil simply by virtue of its polymeric nature. In contrast to the MFVI, the dispersant molecule is much smaller. Consequently, the dispersant is much less shear sensitive, thereby contributing more to the low temperature CCS viscosity (relative to its contribution to the high temperature viscosity of the base oil) than a V.I. improver. Moreover, the smaller dispersant molecule contributes much less to the high temperature viscosity of the base oil than the MFVI. Thus, the magnitude of the low temperature viscosity increase induced by the dispersant can exceed the low temperature viscosity increase induced by the V.I. improver without the benefit of a proportionately greater increase in high temperature viscosity as obtained from an MFVI. Consequently, as the dispersant induced low temperature viscosity increase causes the low temperature viscosity of the oil to approach the maximum low temperature viscosity limit, the more difficult it is to introduce a sufficient amount of MFVI effective to meet the high temperature viscosity requirement and still meet the low temperature viscosity requirement. The formulator is thereby once again forced to shift to the undesirable expedient of using higher proportions of low viscosity oil to permit addition of the requisite amount of MFVI improver without exceeding the low temperature viscosity limit.

In accordance with the present invention, MFVI's are provided which have been found to possess inherent characteristics such that they simultaneously contribute less to low temperature viscosity increases and more toward high temperature viscosity increases than MFVI's of the prior art. Moreover, the advantages are obtained while still preserving the added benefit of dispersancy achieved by derivatization. This allows the formulator to back out more dispersant from the formulation by adding more MFVI than would otherwise be permitted in the absence of the beneficial high and low temperature properties.

U.S. Pat. No. 3,697,429 discloses a lubricating oil composition containing a viscosity index improver amount of an oil soluble polymer composition comprising first a copolymer of ethylene and a $C_3$ to $C_{18}$ olefin having an ethylene content of 50 to 95 mole percent (40–83 weight percent) and a second copolymer of ethylene in a $C_3$ to $C_{18}$ alpha olefin having an ethylene content of 5–80 mole percent (3–70 weight percent). The ethylene content of the first copolymer is at least 5 mole percent (four weight percent) more than the ethylene content of the second copolymer. By mixing the high and low ethylene copolymer a viscosity modifier with advantageous properties is made. The functionalization or derivatization of these polymers is not disclosed.

U.S. Pat. No. 5,068,047 discloses degraded ethylene copolymers of a certain specific type useful as viscosity index improver additives for oleaginous compositions. Said undegraded copolymers have a narrow molecular weight distribution and are comprised of segmented copolymer chains with compositions which are intramolecularly heterogeneous and intermolecularly homogeneous. These undegraded copolymers are segmented copolymers of ethylene and at least one other alpha olefin monomer. Each copolymer is intramolecularly heterogeneous and intermolecularly homogeneous and at least one segment of the copolymer constituting at least 10 percent of the copolymer chain is a crystallizable segment. The term "crystallizable segment" is defined to be each segment of the copolymer chain having a number average molecular weight of at least 700 wherein the ethylene content is at least 57 percent. The remaining segments of the copolymer chain are herein termed "the low crystallinity segments" and are characterized by an average ethylene content of not greater than 53 weight percent. These degraded copolymers may be grafted with various grafting materials to provide materials useful as multifunctional viscosity index improvers. Furthermore, the degraded grafted ethylene copolymer may be reacted with polyamines containing at least two reactive amine groups or polyols to provide materials useful as viscosity index improver dispersant additives for oleaginous compositions.

U.S. Pat. No. 4,735,736 discloses grafting oil soluble hydrocarbon polymers, useful as viscosity index improvers, such as ethylene-propylene copolymer with unsaturated acid materials such as maleic anhydride preferably by solid state grafting in a masticator or extruder followed by reaction with a polyamine, preferably a primary-tertiary polyamine. Although the use of amines having a single primary group such as primary-tertiary amine can reduce crosslinking and gelling particularly at relative high levels of maleic anhydride grafting, an undesirable high degree of viscosity increase may still occur. The further treatment and/or reaction with an aliphatic mono-amine represents a further improvement over prior art, wherein the viscosity increase can be further inhibited.

U.S. Pat. No. 4,780,228 discloses a further improvement in grafting of hydrocarbon polymers in the form of solid polymer in the substantial absence of any solvent or lubricating oil in an extruder or masticator. The grafting of the carboxylic acid e.g., maleic anhydride is done in the presence of a free-radical initiator and in the presence of a chain stopping agent e.g., aliphatic mercaptan which was found to prevent crosslinking of the polymer or the formation of insoluble gel. The product can then be subsequently reacted with an amine or alcohol in a subsequent reaction to form an oil soluble additive.

U.S. Pat. No. 4,517,104 discloses the grafting of ethylene-propylene-copolymer with maleic anhydride and peroxide in a lubricating oil solution. This is followed by addition of an alkenyl succinic anhydride, polyamines and optionally a capping agent.

Commonly Assigned Copending Application U.S. Ser. No. 989,289, filed Dec. 11, 1992 (Docket No. E-296) discloses the reaction of high or low ethylene-copolymers and mixtures thereof with maleic anhydride, peroxide and amination in an extruder.

U.S. Pat. No. 4,863,623 discloses the grafting of an ethylene-propylene-copolymer of 5,000 to 500,000 molecular weight with a carboxylic acid acylating material and is further derivatized with an amino aromatic polyamine compound from the group consisting of N-arylphenylenediamine, amino-thiazole, aminocarbazole, aminoindole, aminopyrrole, amino-indazolinone, amino mercaptotriazole and aminoperimidine.

U.S. Pat. No. 5,073,600 discloses grafting of ethylene-propylene-copolymer with a carboxylic acid material while the functionalization is performed in a high mechanical energy device in the presence of between 3 and 15 weight percent oil and further functionalizing the copolymer with an amine.

U.S. Pat. No. 5,055,213 discloses the reaction of copolymers having carboxylic functionality with phenothiazine derivatives.

U.S. Pat. No. 5,035,821 discloses multifunctional viscosity index improvers comprising the reaction products of ethylene-copolymers reacted or grafted with ethylenically unsaturated carboxylic acid moieties, polyamines or polyols and high functionality long-chain hydrocarbyl substituted dicarboxylic acid materials having a functionality of from 1.2 to 2 and a short-chain hydrocarbyl substituted dicarboxylic acid component.

U.S. Pat. No. 5,075,383 discloses an ethylene copolymer or terpolymer of a $C_3$ to $C_{10}$ alpha monoolefin and optionally a non-conjugated diene or triene having a number average molecular weight ranging from about 5500 to 50,000 with the copolymer molecular weight broken down in an extruder on which has been grafted in the absence of a solvent ethylenically unsaturated carboxylic acid function in a ratio of at least 1.8 moles of said carboxylic acid functions per molecule of said copolymer or terpolymer which is then further derivatized with an antioxidant amino aromatic polyamine compound from the group consisting of N-arylphenylenediamine, amino-carbozole, aminoindole, amino-indazolinane, amino-mercaptotriazole and aminoperimidene.

U.S. Pat. No. 4,839,074 discloses a dual component lube oil flow improver which comprises a $C_{14}$ dialkyl fumarate vinyl acetate interpolymer and a second component which comprises interpolymers of dialkyl fumarates and vinyl esters in which the fumarates are esterified with mixtures of $C_6$ through $C_{20}$ alcohols. The lubricating oil composition containing the lube oil flow improver may include a viscosity index improver as an optional third component. These viscosity index improvers are disclosed to be hydrocarbon polymers which may be degraded in molecular weight by mastication or extrusion, by oxidation or thermodegradation and also included are derivatized polymers such as post-grafted interpolymers of ethylene-propylene with an active monomer such as maleic anhydride which may be further reacted with an alcohol or amine e.g., an alkalene, polyamine or hydroxy amine.

As demonstrated in the technical literature discussed above, it is of continuing importance to provide functionalized copolymers with improved stability, improved performance and improved utility in end use applications.

It is thus a principle objective to this invention to provide functionalized copolymers with improved properties that are useful in lubricating oil compositions as multifunctional viscosity modifiers.

Additional objectives will occur readily to those skilled in the art from the following specification which describes the invention in detail.

SUMMARY OF THE INVENTION

In one aspect of the present invention, there is provided a composition comprising a mixture of a blend weight ratio of Component A: Component B of from about 2.3:1 to about 0.18:1. Component A comprises ethylene alpha olefin copolymer having a number average molecular weight of from about 20,000 to about 100,000 and comprising from about 40 to about 60 weight percent monomer units derived from ethylene, and from about 60 to about 40 wt. percent monomer units derived from α-olefin, functionalized with mono- or dicarboxylic acid material.

Component B comprises ethylene alpha olefin copolymer having a number average molecular weight of from about 20,000 to about 100,000 and comprising from about 60 to about 80 weight percent monomer units derived from ethylene and from about 20 to about 40 wt. percent monomer units derived from α-olefin, functionalized with mono- or dicarboxylic acid material.

In a further aspect of the present invention, a MFVI is provided by derivatizing the above blend with nucleophilic amine.

BRIEF DESCRIPTION OF THE DRAWINGS

The accompanying figures depict for illustration purposes only, the performance of the composition embodied by the present invention wherein:

FIG. 4 illustrates the storage stability of multifunctional viscosity modifier concentrates as measured periodically by kinematic viscosity.

DESCRIPTION OF PREFERRED EMBODIMENTS Ethylene Copolymers

Figure 1:
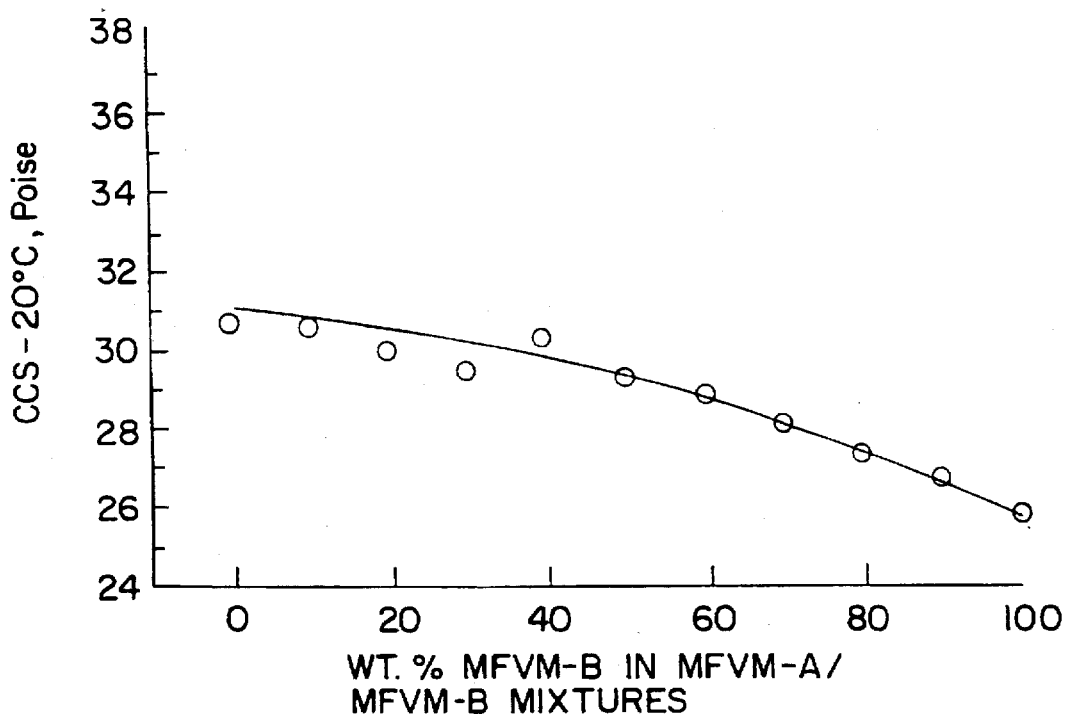
FIG. 1 illustrates multifunctional viscosity modifiers blended into 10W40 fully formulated oils and their performance in the Cold Cranking Simulator Test.

The copolymers employed to make the blends of the present invention are ethylene-alpha olefin copolymers comprising monomer units derived from ethylene and alpha olefins typically $C_3$ to $C_{28}$, preferably $C_3$ to $C_{18}$, most preferably $C_3$ to $C_8$ alpha olefins.

While not essential, such polymers preferably have a degree of crystallinity of less than 25 wt. percent as determined by x-ray and differential scanning calorimetry. Copolymers of ethylene and propylene are most preferred.

Representative examples of other suitable alpha-olefins include 1-butene, 1-pentene, 1-hexene, 1-heptene, 1-octene, 1-nonene, 1-decene, etc; also branched chain alpha-olefins, such as 4 methyl-1-pentene, 4-methyl-1-hexene, 5 methyl pentene-1, 4.4 dimethyl-1-pentene, and 6 methylheptene-1 and mixtures thereof. Ter- and tetra- copolymers are included within the scope of copolymers.

Oil soluble ethylene alpha olefin copolymers used in the invention generally will have a number average molecular weight ($\overline{Mn}$) of typically from about 20,000 to about 100,000, preferably from about 25,000 to about 80,000 and most preferably from about 25,000 to about 50,000. Suitable polymers will typically have a narrow molecular weight distribution (MWD), as determined by the ratio of weight average molecular weight ($\overline{Mw}$) to number average molecular weight ($\overline{Mn}$). Polymers having a $\overline{Mw}/\overline{Mn}$ of less than 10, preferably less than 7, and more preferably 4 or less are most desirable. As used herein ($\overline{Mn}$) and ($\overline{Mw}$) are measured by the well known techniques of vapor phase osmometry (VPO), membrane osmometry and gel permeation chromatography. In general, polymers having a narrow range of molecular weight may be obtained by a choice of synthesis conditions such as choice of principal catalyst and cocatalyst combination, addition of hydrogen during the synthesis, etc. Post synthesis treatment such as extrusion at elevated temperature and under high shear through small orifices, mastication under elevated temperatures in the presence of peroxides or air, thermal degradation, fractional precipitation from solution, etc., may also be used to obtain narrow ranges of desired molecular weights and to break down higher molecular weight polymer to the above described molecular weights.

The copolymers employed to make the component blends of the present invention are differentiated primarily by their ethylene content polymer.

Thus, Component A is derived from a low ethylene monomer unit content polymer and Component B is derived from a high ethylene monomer unit content.

More specifically, the low ethylene content copolymer will comprise typically from about 30 to about 60, preferably from about 40 to about 50 and most preferably from about 42 to about 46 (e.g., 44) weight percent monomer units derived from ethylene; and typically from about 70 to about 40, preferably from about 60 to about 50, and most preferably from about 58 to about 54 (e.g., 56) weight percent monomer units derived from alpha-olefin.

The high ethylene content copolymer will comprise typically from about 60 to about 80, preferably from about 65 to about 75, and most preferably from about 68 to about 73 (e.g., 70) weight percent monomer units derived from ethylene; and typically from about 40 to about 20, preferably from about 35 to about 25, and most preferably from about 32 to about 27 (e.g., 30) weight percent monomer units derived from α-olefin.

The above ethylene contents are subject to the proviso that the ethylene content of the high and low ethylene copolymers must differ by at least 5, preferably at least 10, and most preferably at least 15 weight percent.

Many such ethylene alpha olefin copolymers are available as items of commerce and their composition and methods for producing them are well known in the art. Representative examples include: MDV-90-9 manufactured by Exxon Chemical Company, an ethylene-propylene copolymer containing 70 weight percent ethylene, which is further characterized by a Mooney viscosity, ML, 1+4@125° C. of 18°, and VISTALON® 457 manufactured by Exxon Chemical Company, a 44 weight percent ethylene, ethylene-propylene copolymer which is further characterized by a Mooney viscosity, ML 1+4@125° C. of 28.

For ease of discussion, blend components derived from low ethylene content copolymer, as described above, are referred to herein as Component-A and blend components derived from high ethylene content copolymer, as described above, are referred to herein as Component-B.

As indicated above, the present invention is directed to blends of Components A and B. Such blends will comprise typically weight ratios of A:B from about 2.3:1 to about 0.18:1, preferably from about 1.2:1 to about 0.25:1, and most preferably from about 0.8:1 to about 0.33:1 (e.g., 0.428:1).

The above corresponding ranges for the relative amounts of Components A and B are referred to herein as "blend ratios". Such blend ratios are also applicable to unfunctionalized high and low ethylene content polymer blends in preparation for functionalization. To prepare the MFVI of the present invention, the high and low ethylene alpha copolymers are first functionalized and then derivatized.

Functionalized Polymers

The polymers produced in accordance with the present invention can be functionalized. By functionalized, it is meant that the polymer is chemically modified to have at least one functional group present within its structure, which functional group is capable of undergoing further chemical reaction (e.g., derivatization) with other materials.

More specifically, the functional group is desirably incorporated into the polymer as pendant groups from the polymer backbone.

The functional group typically will be polar and can contain hetero atoms such as O, S, N, and /or halogen.

The preferred functionalization reaction is accomplished by reaction of the polymer with the functional compound containing the functional group by free radical addition using a free radical catalyst.

Characterization of the degree to which the polymer has been functionalized is referred to herein as "functionality."

Functionality refers generally to the average number of functional groups present within the polymer structure per polymer chain. Thus, functionality can be expressed as the average number of moles of functional groups per "mole of polymer." When said "mole of polymer" in the functionality ratio includes both functionalized and unfunctionalized polymer, functionality is referred to herein as F*.

The distinction between F and F* arises when all the polymer chains do not undergo reaction with the functional compound. In this instance typical analytical techniques employed to determine F* will normally necessitate identification of the weight fraction of functionalized polymer, based on the total weight of polymer (functionalized+ unfunctionalized) in the sample being analyzed for functionality. This weight fraction is commonly referred to as Active Ingredient or AI. Since the determination of AI is a separate analytical step, it can be more convenient to express functionality as F rather than F*. In any event, both F and F* are alternate ways of characterizing the functionality.

As a general proposition, the polymer of the present invention can be functionalized to any functionality effective to impart properties suitable for the end use contemplated.

Effective functionalities (F*) for viscosity modifier end uses are contemplated to be typically greater than about 3, and preferably greater than about 10, and typically will range from about 3 to about 20, preferably from about 5 to about 15, and most preferably from about 8 to about 15. Most preferably, the polymer will be functionalized to graft about 1 functional group for every 5,000 molecular weight segment in the polymer.

Acyl Functionalized Polymer

The most preferred functionalization technique of the present invention is to chemically modify the polymer to have chemical moieties present within its structure which contain or constitute at least one acyl functional group, i.e.,

wherein X is hydrogen, nitrogen, hydroxy, oxyhydrocarbyl (e.g., ester), oxygen, the salt moiety —OM wherein M is a metal, e.g., alkali, alkaline earth, transition metal, copper zinc and the like or two acyl groups may be joined through (X) as for anhydrides.

Within this broad class of compounds the most preferred are acyl groups derived from monounsaturated mono- or dicarboxylic acids and their derivatives, e.g., esters and salts.

More specifically, polymer functionalized with mono- or dicarboxylic acid material, i.e., acid, anhydride, salt or acid ester suitable for use in this invention, includes the reaction product of the polymer with a monounsaturated carboxylic reactant comprising at least one member selected from the group consisting of (i) monounsaturated $C_4$ to $C_{10}$ dicarboxylic acid (preferably wherein (a) the carboxyl groups are vicinyl, (i.e., located on adjacent carbon atoms) and (b) at least one, preferably both, of said adjacent carbon atoms are part of said monounsaturation); (ii) derivatives of (i) such as anhydrides or $C_1$ to $C_5$ alcohol derived mono- or diesters of (i); (iii) monounsaturated $C_3$ to $C_{10}$ monocarboxylic acid wherein the carbon-carbon double bond is conjugated allylic to the carboxyl group, i.e., of the structure

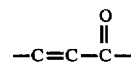

and (iv) derivatives of (iii) such as $C_1$ to $C_5$ alcohol derived monoesters of (iii).

Suitable unsaturated acid materials thereof which are useful functional compounds, include acrylic acid, crotonic acid, methacrylic acid, maleic acid, maleic anhydride, fumaric acid, itaconic acid, itaconic anhydride, citraconic acid, citraconic anhydride, mesaconic acid, glutaconic acid, chloromaleic acid, aconitic acid, crotonic acid, methylcrotonic acid, sorbic acid, 3-hexenoic acid, 10-decenoic acid, 2-pentene-1,3,5-tricarboxylic acid, cinnamic acid, and lower alkyl (e.g., $C_1$ to $C_4$ alkyl) acid esters of the foregoing, e.g., methyl maleate, ethyl fumarate, methyl fumarate, etc. Particularly preferred are the unsaturated dicarboxylic acids and their derivatives; especially maleic acid, fumaric acid and maleic anhydride.

As previously discussed, the two component multifunctional viscosity modifiers described above can be prepared in several ways. The functional groups can be grafted to each of the copolymers separately and then the functionalized copolymers can then be mechanically blended at the above described blend ratios. In the preferred method for practicing the invention, the two copolymers are simultaneously functionalized and blended at the same time at the above blend ratios by feeding into an extruder, masticator or reactor.

The extrusion process is continuous, while the masticator process is a batch process. Both take place in a polymer melt, i.e., the polymer is melted in the high temperature, high shear conditions of this equipment. The functionalization takes place in absence of a solvent. The reactor process is a process similar to the masticator batch process but the polymer is functionalized once it is dissolved in a solvent such as mineral oil. The extruder and masticator processes can provide efficient peroxide and or thermo oxidative induced molecular weight reduction of the copolymers, should a lower molecular weight be desired than that of the copolymer that is available.

It will be understood that blends of the high and low ethylene content polymers will create a bimodel distribution of ethylene content not achievable by making a single polymer having a single average ethylene content.

Functionalization by Free-Radical Grafting

Free-radical induced grafting can take place in a polymer melt in a extruder or masticator, or when using a conventional batch reactor with the polymer dissolved in a solvent, preferably in a mineral lubricating oil.

The free-radical grafting is preferably carried out using free radical initiators such as peroxides, hydroperoxides, and azo compounds and preferably those which have a boiling point greater than about 100° C. and which decompose thermally within the grafting temperature range to provide said free radicals. Representative of these free-radical initiators are azobutyro-nitrile, 2,5-dimethyl-hex-3-yne-2, 5 bis-tertiary-butyl peroxide (sold as Lupersol 130) or its hexane analogue, di-tertiary butyl peroxide and dicumyl peroxide. The initiator is generally used at a level of between about 0.005 percent and about 1 percent, based on the total weight of the polymer.

The ethylenically unsaturated carboxylic acid material, preferably maleic anhydride, will be generally used in an amount ranging from about 0.01 percent, based on about 10 percent, preferably 0.1 to 2.0 percent, based on weight of copolymer. The aforesaid carboxylic acid material and free radical initiator are generally used in a weight percent ratio range of 1.0:1 to 30:1, preferably 3.0:1 to 6:1.

When the copolymer grafting takes place in a solvent in a reactor, the initiator grafting is preferably carried out in an inert atmosphere, such as that obtained by nitrogen blanketing. While the grafting can be carried out in the presence of air, the yield of the desired graft polymer is generally thereby decreased as compared to grafting under an inert atmosphere substantially free of oxygen. The grafting time will usually range from about 0.1 to 12 hours, preferably from about 0.5 to 6 hours, more preferably 0.5 to 3 hours. The graft reaction will be usually carried out to at least approximately 4 times, preferably at least about 6 times the half-life of the free-radical initiator at the reaction temperature employed, e.g., with 2,5-dimethyl hex-3-yne-2, 5-bis(t-butyl peroxide) 2 hours at 160° C. and one hour at 170°C., etc.

In the grafting process, usually the copolymer solution is first heated to grafting temperature and thereafter said unsaturated carboxylic acid material and initiator are added with agitation, although they could have been added prior to heating. When the reaction is complete, the excess acid material can be eliminated by an inert gas purge, e.g., nitrogen sparging. Preferably the carboxylic acid material that is added is kept below its solubility limit in the polymer solution, e.g., below about 1 wt. percent, preferably below 0.4 wt. percent or less, of free maleic anhydride based on the total weight of polymer-solvent solution, e.g., ethylene copolymer-mineral lubricating oil solution. Continuous or periodic addition of the carboxylic acid material along with an appropriate portion of initiator, during the course of the reaction, can be utilized to maintain the carboxylic acid below its solubility limits, while still obtaining the desired degree of total grafting.

In the initiator grafting step the maleic anhydride or other carboxylic acid material used will be grafted onto both the polymer and the solvent for the reaction. Many solvents such as dichlorobenzene are relatively inert and may be only slightly grafted, while mineral oil will tend to be more grafted. The exact split of graft between the substrate present depends upon the polymer and its reactivity, the reactivity and type of oil, the concentration of the polymer in the oil, and also upon the maintenance of the carboxylic acid material in solution during the course of the reaction and minimizing the presence of dispersed, but undissolved acid, e.g., the maleic anhydride. The undissolved acid material appears to have an increased tendency to react to form oil insoluble materials as opposed to dissolved acid material. The split between grafted oil and grafted polymer may be measured empirically from the infrared analyses of the product dialyzed into oil and polymer fractions. Obviously, grafting of the solvent is desirably kept to a minimum.

The grafting is preferably carried out in a mineral lubricating oil which need not be removed after the grafting step but can be used as the solvent in the subsequent reaction of the graft polymer with the amine material and as a solvent for the end product to form the lubricating additive concentrate. The oil having attached, grafted carboxyl groups, when reacted with the amine material will also be converted to the corresponding derivatives but such derivatives are of little use to improvement in performance.

The solution grafting step when carried out in the presence of a high temperature decomposable peroxide can be accomplished without substantial degradation of the chain length (molecular weight) of the ethylene-containing polymer.

A description for functionalizing in a masticator can be found in U.S. Pat. No. 4,735,736, and a description for functionalizing the copolymers, dissolved in a solvent such as mineral oil, in a reactor can be found in U.S. Pat. No. 4,517,104; the disclosures of which are herein incorporated by reference.

In contrast, reactions carried out in the polymer melt, particularly in an extruder, are characterized by maximized reaction rates and minimized reactor volumes (due to the absence of a diluent solvent), by absence of side reactions with the solvent and by minimized residence times (due to the absence of dissolution and recovery steps before and after the reaction, respectively).

Methods for extruder grafting are disclosed in commonly assigned U.S. Ser. No. 989, 289, filed on Dec. 11, 1992, date herewith (Titled "Multiple Reaction Process in Melt Processing Equipment" (Docket ref. no.: E-296) the disclosure of which is herein incorporated by reference.

Optional Acid Component

In order to prevent or minimize the crosslinking or gellation of the grafted copolymer, particularly when it is subsequently aminated with amines having more than one reactive primary or secondary nitrogens, an optional acid functionalized low molecular weight hydrocarbyl component can be added to the functionalized polymers to moderate molecular weight growth of the derivatized polymer. Such materials are referred to herein as "Growth Regulators".

Suitable Growth Regulators include: hydrocarbyl substituted succinic anhydride or acid having 12 to 49 carbons, preferably 16 to 49 carbons in said hydrocarbyl group; long chain monocarboxylic acid of the formula RCOOH where R is a hydrocarbyl group of 50 to 400 carbons and long chain hydrocarbyl substituted succinic anhydride or acid having 50 to 400 carbons in said hydrocarbyl group. Said hydrocarbyl groups are essentially aliphatic and include alkenyl and alkyl groups. The longer chain acids and anhydrides are preferred particularly when the grafting reaction is carried out in lubricating oil because of ability to impart dispersancy to reacted oil molecules as well as their greater solubilizing effect.

Primarily because of its ready availability and low cost, the hydrocarbyl portion, e.g., alkenyl groups, of the carboxylic acid or anhydride is preferably derived from a polymer of a $C_2$ to $C_5$ monoolefin, said polymer generally having a molecular weight of about 140 to 6500, e.g., 700 to about 5000, most preferably 700 to 3000 molecular weight. Particularly preferred is polyisobutylene of 950 molecular weight.

Derivatized Polymers

As indicated above, a functionalized polymer is one which is chemically modified primarily to enhance its ability to participate in a wider variety of chemical reactions than would otherwise be possible with the unfunctionalized polymer.

In contrast, a derivatized polymer is one which has been chemically modified to perform one or more functions in a significantly improved way relative to the unfunctionalized polymer and or the functionalized polymer. The primary new function sought to be imparted to the functionalized polymers of the present invention is dispersancy in lubricating oil compositions.

Typically, derivatization is achieved by chemical modification of the functionalized polymer.

More specifically, the functionalized polymer can be derivatized by reaction with at least one derivatizing compound to form derivatized polymers. The derivatizing compound typically contains at least one reactive derivatizing group. The reactive derivatizing group is typically selected to render it capable of reacting with the functional groups of the functionalized polymers by the various reactions described below. Representative of such reactions are nucleophilic substitution, transesterification, salt formations, and the like. The derivatizing compound preferably also contains at least one additional group suitable for imparting the desired properties to the derivatized polymer, e.g., polar groups. Thus, such derivatizing compounds typically will contain one or more groups including amine, hydroxy, ester, amide, imide, thio, thioamido, oxazoline or salt groups derived from reactive metal or reactive metal compounds.

Thus, the derivatized polymers can include the reaction product of the above recited functionalized polymer with a nucleophilic reactant which include amines, alcohols, amino-alcohols and mixtures thereof to form oil soluble salts, amides, imides, oxazolines, and esters of mono- and dicarboxylic acids, esters or anhydrides.

The preferred properties sought to be imparted to the derivatized polymer include viscosity modification (e.g., primarily viscosity modification with attendant secondary dispersant properties).

Multifunctional viscosity modifiers possess attendant dispersant properties when the polymer from which they are derived is functionalized and derivatized with groups which contribute to dispersancy as described hereinafter.

Various types of MFVI's can be made by derivatizing the functionalized polymer of the present invention which are suitable for use in lubricant compositions the preferred types include reaction products of functionalized polymer of the present invention derivatized with nucleophilic reagents such as amine compounds, e.g., nitrogen-containing compounds, organic hydroxy compounds such as phenols and alcohols, and/or basic inorganic materials.

More specifically, nitrogen- or ester-containing MFVI comprise members selected from the group consisting of oil-soluble salts, amides, imides, oxazolines and esters, or mixtures thereof, of the polymer of the present invention, functionalized with mono- and dicarboxylic acids or anhydride or ester derivatives thereof.

At least one functionalized polymer is mixed with at least one of amine, alcohol, including polyol, aminoalcohol, etc., to form the MFVI additive components.

Derivatized Polymer from Amine Compounds

Of the various amines useful in the practice of this invention, one amine type has two or more primary amine groups, wherein the primary amine groups may be unreacted, or wherein one of the amine groups may already be reacted.

Particularly preferred amine compounds have the following formulas:

(A) alkylene polyamines

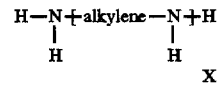

wherein x is an integer of about 1 to 10, preferably about 2 to 7, and the alkylene radical is a straight or branched chain alkylene radical having 2 to 7, preferably about 2 to 4 carbon atoms;

(B) polyoxyalkylene polyamines

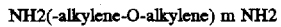

where m has a value of about 3 to 70 and preferably 10 to 35; and

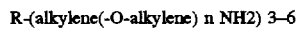

where n has a value of about 1 to 40 with the provision that the sum of all the n's is from about 3 to about 70 and preferably from about 6 to about 35 and R is a polyvalent saturated hydrocarbon radical of up to ten carbon atoms having a valence of 3 to 6. The alkylene groups in either formula (i) or (ii) may be straight or branched chains containing about 2 to 7, and preferably about 2 to 4 carbon atoms.

Examples of the alkylene polyamines of formula (A) above include methylene amines, ethylene amines, butylene amines, propylene amines, pentylene amines, hexylene amines, heptylene amines, octylene amines, other polymethylene amines, the cyclic and higher homologs of these amines such as the piperazines, the amino-alkyl-substituted piperazines, etc. These amines include, for example, ethylene diamine, diethylene triamine, triethylene tetramine, propylene diamine, di(heptamethylene)triamine, tripropylene tetramine, tetraethylene pentamine, trimethylene diamine, pentaethylene hexamine, di(trimethylene)triamine, 2-heptyl-3-(2-aminopropyl)imidazoline, 4-methylimidazoline, 1,3-bis-(2-aminoethyl)imidazoline, pyrimidine, 1-(2-aminopropyl)-piperazine, 1,4-bis-(2-aminoethyl)piperazine, N,N-dimethyaminopropyl amine, N,N-dioctylethyl amine, N-octyl-N'-methylethylene diamine, 2-methyl-1-(2-aminobutyl) piperazine, etc. Other higher homologs which may be used can be obtained by condensing two or more of the above-mentioned alkylene amines in a known manner.

The ethylene amines which are particularly useful are described, for example, in the Encyclopedia of Chemical Technology under the heading of "Ethylene Amines" (Kirk and Othmer), Volume 5, pgs. 898–905; Interscience Publishers, New York (1950). These compounds are prepared by the reaction of an alkylene chloride with ammonia. This results in the production of a complex mixture of alkylene amines, including cyclic condensation products such as piperazines. While mixtures of these amines may be used for purposes of this invention, it is obvious that pure alkylene amines may be used with complete satisfaction.

The polyoxyalkylene polyamines of formula (B) above, preferably polyoxyalkylene diamines and polyoxyalkylene triamines, may have average molecular weights ranging from about 200 to about 4000 and preferably from about 400 to about 2000. The preferred polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

The reactive compounds which can be used to react with the functionalized polymer will, of course, depend on the nature of the grafted functional compound. In the case of the preferred grafted functional compound, maleic anhydride, those that will react advantageously with anhydride functionality are appropriate. This includes alcohols, thioalcohols, and amines. Of these, amines are preferred. Primary amines are more preferred because of the stability of the imide products formed. Most preferred are primary amines, $RNH_2$, in which the R group contains functionalities that it is desired to have in the final product. Although such products contain two functionalities, the imide functionality formed by reaction of the primary amine is relatively inert and serves as a stable linkage between the functionality in the R group and the polymer backbone.

Functionalities that are desirable for inclusion in the product through inclusion in the R group of the primary amine, $RNH_2$, will depend on the application for which the product is intended. In the examples below application of the product as a multifunctional viscosity modifier for lubricating oil is illustrated. In this application it is desired that the R group of the primary amine $RNH_2$ contain tertiary amine functionality.

Examples of useful primary amines, $RNH_2$, in which the R group contains tertiary amine functionality include:

N,N-dimethylethylenediamine

N,N-diethylethylenediamine

N,N-dimethyl-1,3-propanediamine

N,N-diethyl-1,3-propanediamine 4-aminomorpholine 4-(aminomethyl)pyridine 4-(2-aminoethyl)morpholine 4-(3-aminopropyl)morpholine Examples of useful primary amines, $RNH_2$, in which the R group contains secondary amine functionality include:

N-methylethylenediamine,

N-ethylethylenediamine,

N-phenylethylenediamine,

N-methyl-1,3-propanediamine,

N-phenyl-1,2-phenylenediamine,

N-phenyl-1,4-phenylenediamine, 1-(2-aminoethyl)piperazine, 4-(aminomethyl)piperidine, Examples of useful primary amines, $RNH_2$, in which the R group contains alcohol functionality include:

ethanolamine 2-amino-1-propanol 3-amino-1-propanol 2-amino-1-butanol 2-aminobenzyl alcohol Preferred reactive compounds for reaction with grafted maleic anhydride in the practice of this invention are 4-(3-aminopropyl)morpholine and 1-(2-aminoethyl)-piperazine.

Still other amines useful in the practice of this invention include amino-aromatic polyamine compounds from the group consisting of:

(a) an N-arylphenylenediamine represented by the formula:

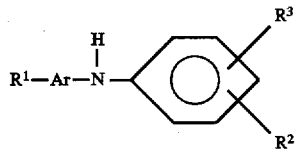

in which Ar is aromatic and $R^1$ is hydrogen, —NH—Aryl, —NH—Arylkyl, a branched or straight chain radical having from 4 to 24 carbon atoms that can be alkyl, alkenyl, alkoxyl, aralkyl, alkaryl, hydroxyalkyl or aminoalkyl, $R^2$ is $NH_2$, —(NH(CH$_2$)n—)m—NH$_2$, CH$_2$—(CH$_2$)n—NH$_2$, —aryl—NH$_2$, in which n and m has a value from 1 to 10, and $R^3$ is hydrogen, alkyl, alkenyl, alkoxyl, aralkyl, alkaryl having from 4 to 24 carbon atoms, or formula:

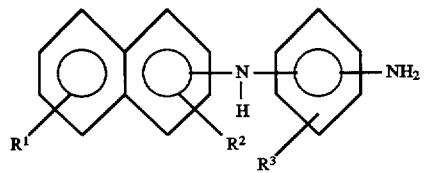

in which $R^1$, $R^2$ and $R^3$ are hydrogen or a linear or branched hydrocarbon radical containing from 1 to 10 carbon atoms that may be alkyl, alkenyl, alkoxyl alkaryl, aralkyl, hydroxyalkyl, or aminoalkyl.

(b) an aminocarbazole represented by the formula:

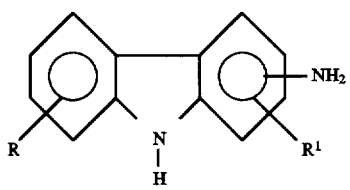

in which R and $R^1$ represent hydrogen or an alkyl, alkenyl, or alkoxyl radical having from 1 to 14 carbon atoms, (c) an aminodole represented by the formula:

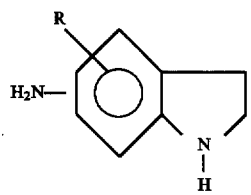

in which R represents hydrogen or an alkyl radical having from 1 to 14 carbon atoms, (d) an amino-indazolinone represented by the formula:

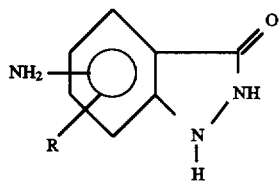

in which R is hydrogen or an alkyl radical having from 1 to 14 carbon atoms, (e) an aminomercaptotriazole represented by the formula:

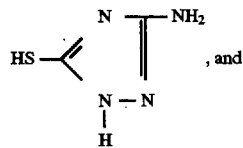

(f) an aminoperimidine represented by the formula:

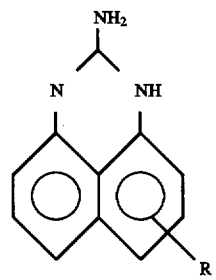

in which R represents hydrogen or an alkyl or alkoxyl radical having from 1 to 14 carbon atoms.

Particularly preferred N-arylphenylenediamines are the N-phenylphenylenediamines, for example, N-phenyl-1,4-phenylenediamine, N-phenyl-1,3-phenylenediamine, N-phenyl-1,2-phenylenediamine, N-naphthyl-phenylenediamine, N-phenyl-naphthalenediamine and N'-aminopropyl-N-phenylphenylene-diamine.

Other useful amines include: an aminothiazole from the group consisting of aminothiazole, aminobenzothiazole, aminobenzothiadiazole and aminoalkylthiazole, and also an aminopyrrole represented by the formula:

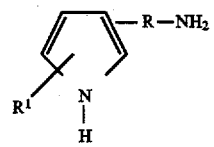

in which R is a divalent alkylene radical having 2–6 carbon atoms and $R^1$ hydrogen or an alkyl radical having from 1 to 14 carbon atoms.

Other useful amines include phenothiazine and phenothiazine derivatives, particularly 10-aminopropyl-phenothiazine, amino-3-propylaminophenothiazine. N-amino-propyl-2-naphthylamine and N-aminopropyldiphenylamine and amines of the general formula:

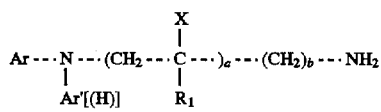

wherein wherein Ar and Ar' are linked together to form a heterocyclic structure with the nitrogen to which they are attached $R_1$ is a hydrogen atom, a $C_1$–$C_{18}$ linear or branched alkyl radical, or an aromatic radical X is a hydrogen atom, halogen, OH or $NH_2$ group a and b are integers, a is between 0 and 5 b is between 0 and 6, and the sum $a+b \geq 1$.

The Derivatization Process

As indicated above, functionalization can be conducted separately on the high and low ethylene content polymers or the high and low ethylene content polymers can be blended at the aforedescribed blend ratios and then functionalized.

If the latter option is employed, derivatization is conducted on the blend.

If the former option is employed, (separate functionalization) one has the additional options of derivatizing separately and blending. The final derivatized products or blending the separately functionalized copolymers and derivatizing the blend simultaneously.

The derivatization procedures described below are equally applicable to any of the above options.

The functionalized ethylene α-olefin copolymer can be derivatized with amine in the melt or in solution. Melt derivatizations can in turn be conducted in an extruder or masticator.

When the amination takes place in an extruder or masticator, conditions are substantially the same as the functionalization step. A stripping step can take place prior to amination to remove the unwanted byproducts of the graft step which can lead to undesirable byproducts as a consequence of the amination.

When the amination takes place in a reactor, the functionalized polymer is dissolved in solution (e.g., in oil) at an amount of typically from about 5 to 30, preferably 10 to 20 wt. percent polymer, based on the solution weight.

Moreover, the functionalized polymer can be aminated and capped simultaneously in any of the above derivatization modes.

Accordingly, the functionalized polymer is preheated at a temperature of from about 100° C. to 250° C., preferably from 170° to 230° C., said amine and optional Growth Regulator added and temperatures maintained for from about 1 to 10 hours, usually about 2 to about 6 hours. The heating is preferably carried out to favor formation of imides rather than amides and salts. Removal of water assures completion of the imidation reaction. Reaction ratios can vary considerably, depending upon the reactants, amounts of excess, type of bonds formed, etc.

Generally from about 1 to 2, preferably about 1 mole of bi-primary amine, and about 1 to 4, preferably about 1.5 to 3, most preferably about 2 mole equivalents of said Growth Regulator (e.g. 2 moles of monocarboxylic or 1 mole of dicarboxylic acid component), is preferably used, per mole of the grafted dicarboxylic acid moiety content, e.g. grafted maleic anhydride content. For example, with an ethylene-propylene copolymer of about 40,000 ($\overline{M}n$), i.e. a thickening efficiency of about 2.1, and averaging 4 maleic anhydride groups per molecule, and making imides, about 4 moles of amine with two primary groups and about 4 moles of alkenyl succinic anhydride would preferably be used per mole of grafted copolymer.

Optional Use of Capping Agent

It has been found that many of these multifunctional viscosity modifiers which contain unreacted primary or secondary amine, can undergo an increase in molecular weight which is manifested by product gellation or viscosity growth of the resultant concentrates in oil. For this reason it has been found useful to post-treat or cap these products with $C_{12}$ to about $C_{16}$ hydrocarbyl substituted dicarboxylic acid or anhydride to stabilize the molecular weight.

The short chain hydrocarbyl substituted dicarboxylic acid component is a dicarboxylic or anhydride, preferably a dicarboxylic acid anhydride, substituted with a $C_{12}$ to about $C_{16}$ hydrocarbyl group. The short chain hydrocarbyl substituted dicarboxylic acid anhydride used in the present invention may be represented by the general formula RX, wherein R is a hydrocarbyl group containing a total of 12 to about 16, preferably 12 to about 14, and most preferably 12 carbons, which are essentially aliphatic, saturated or unsaturated, and include alkenyl and alkyl groups, and can be straight chain or branched. When R is an alkenyl group it is preferred that the olefinic unsaturation site be located near the anhydride, i.e., X, moiety. The radical X will usually contain 4 to 10, preferably 4 to 8, more preferably 4 to 6, and most preferably 4, carbon atoms and will define a dicarboxylic acid anhydride. The X radical may be represented by the formula

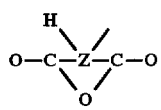

wherein Z is selected from alkylene and alkenylene radicals containing from 2 to 8, preferably 2 to 6, more preferably 2 to 4, and most preferably 2 carbon atoms. Preferably Z is an alkylene radical. The most preferred X radical is the succinic anhydride radical, i.e.,

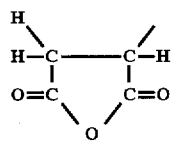

The X radical is linked to the R group by a carbon linkage.

Dicarboxylic acid anhydride materials of the above types and methods for their production are well known. Alkenyl substituted dicarboxylic acid anhydride can be made by the reaction of the $C_{12}$ to about $C_{16}$ alpha-mono-olefin, or chlorinated mono-olefin, with maleic anhydride.

The preferred short chain hydrocarbyl substituted dicarboxylic acid component is a $C_{12}$ to about $C_{16}$, preferably $C_{12}$ to $C_{14}$, and most preferably $C_{12}$ alkenyl substituted succinic anhydride.

It is important that the hydrocarbyl group of the short chain hydrocarbyl substituted dicarboxylic acid anhydride contains from 12 to about 16, preferably from 12 to 14, and most preferably 12 carbon atoms. If a dicarboxylic acid anhydride containing no hydrocarbyl substituent groups, e.g., succinic anhydride, or one containing a hydrocarbyl substitutent group of less than 12 carbon atoms is utilized it will contribute to the formation of insoluble oil particles and resultant haze as discussed hereinafore.

If, on the other hand, the dicarboxylic acid anhydride is substituted with a hydrocarbyl group containing more than about 16 carbon atoms it will contribute to an adverse effect on the low temperature viscosity of the oleaginous composition, e.g., lube oil. This makes it harder to crank the engine in cold weather to start the engine.

Multifunctional Viscosity Modifier Concentrates and Lubricant Oil Compositions

A minor amount, e.g. 0.001 up to 50 wt. percent, preferably 0.005 to 25 wt. percent, based on the weight of the total composition, of the functionalized blend or derivatized blend produced in accordance with this invention can be incorporated into a major amount of an oleaginous material, such as a lubricating oil or hydrocarbon fuel, depending upon whether one is forming finished products or additive concentrates. When used in lubricating oil compositions, e.g., automotive or diesel crankcase lubricating oil, the derivatized blend is present at concentrations usually within the range of about 0.01 to 10 wt. percent, e.g., 0.1 to 6.0 wt. percent, preferably 0.25 to 3.0 wt. percent, of the total composition. It will be apparent, to those skilled in the art, that the particular blend ratios and amount of the blend added to the lubricating oil is dependent upon the properties of the oil such as viscosity, viscosity index and pour point. The lubricating oils to which the products of this invention can be added include not only hydrocarbon oil derived from petroleum, but also include synthetic lubricating oils such as esters of dibasic acids; complex esters made by esterification of monobasic acids, polyglycols, dibasic acids and alcohols; polyolefin oils, etc.

The above oil compositions may contain other conventional additives, such as dyes, Lube Oil Flow Improvers (LOFI's), antiwear agents, antioxidants, other viscosity-index improvers, dispersants, etc.

As previously discussed, the derivatized blends of the invention may be utilized in a concentrate form, e.g., from about 5 wt. percent up to about 50 wt. percent, preferably 7 to 25 wt. percent, in oil, e.g., mineral lubricating oil, for ease of handling, and may be prepared in this form by carrying out the reaction of the invention in oil as previously discussed. If the product of this invention was made in a melt in an extruder or masticator then the product could be pelletized and then the pellets can be subsequently dissolved to make a concentrate or dissolved directly into a lubricant oil composition.

Lube Oil Flow Improver (LOFI)

To enhance the low temperature performance of the lubricant formulation made from the viscosity modifiers of the present invention, a Lube Oil Flow Improver (LOFI) can be added to the viscosity modifier concentrate or directly to the formulated lubricant oil.

These lube oil flow improvers lower the temperature at which the fluid will flow or can be poured. Representative LOFI's include $C_6$–$C_{18}$ dialkyl fumarate vinyl acetate copolymers.

The preferred lube oil flow improver is described in U.S. Pat. No. 4,839,074 which is incorporated herein by reference.

Optional Dispersant Component

It has been found that the derivatized blend of this invention can undergo additional increases in molecular weight, crosslinking or gellation both in the absence of oil or in the presence of oil, e.g., in a concentrate. It has been found that addition of a ashless dispersant can inhibit this problem. Suitable ashless dispersants are disclosed in U.S. Pat. No. 5,102,566, the disclosure of which is herein incorporated by reference. An amount of 0.01 wt. percent to 50 wt. percent based on the weight of the copolymer or 0.01 wt. percent to 5 wt. percent based on the weight of the copolymer concentrate is effective. Suitable dispersants include high molecular weight alkenyl succinimides, e.g., the reaction product of oil soluble polyisobutylene succinic anhydride with ethylene amines such as tetra-ethylene pentamine and the borated salts thereof. Suitable polymer molecular weights for the dispersant can range from 700 to about 3,000, preferably 900 to 2500. The preferred dispersant is a 950 molecular weight borated alkenyl succinimide.

Forms of the Product

Another advantage of the present process is that it permits the preparation of pelletized multifunctional viscosity modifiers for lubricating oils. Most multifunctional viscosity modifiers are prepared in oil solutions and are sold and transported as such. This significantly increases the cost of transporting such materials. In addition intensive mixing is required to get the initial polymer backbone into solution. The pellets produced by the current process can be easily shipped in bulk without the required oil solution. The pellets also dissolve in lubricating oil quite readily requiring less mixing than present blending processes. A further aspect of this invention is the dusting of the copolymer pellets with materials to prevent the pellets from sticking. Dusting agents include ethylene vinyl acetate copolymer and calcium stearate.

As discussed previously, the above oil compositions may optionally contain other conventional additives such as pour point depressants, antiwear agents, antioxidants, other viscosity-index improvers, dispersants, corrosion inhibitors, antifoaming agents, detergents, rust inhibitors, friction modifiers, and the like.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such a polyisobutylene, with from 5 to 30 wt. percent of a sulfide of phosphorus of ½ to 15 hours, at a temperature in the range of about 66° to about 316° C. Neutralization of the phosphosulfurized hydrocarbon may be effected in the manner taught in U.S. Pat. No. 1,969,324.

Oxidation inhibitors, or antioxidants, reduce the tendency of mineral oils to deteriorate in service which deterioration can be evidenced by the products of oxidation such as sludge and varnish-like deposits on the metal surfaces, and by viscosity growth. Such oxidation inhibitors include alkaline earth metal salts of alkyl-phenolthioesters having preferably $C_5$ to $C_{12}$ alkyl side chains, e.g., calcium nonylphenol sulfide, barium octylphenyl sulfide, dioctylphenylamine, phenylalphanaphthylamine, phospho-sulfurized or sulfurized hydrocarbons, etc.

Other oxidation inhibitors or antioxidants useful in this invention comprise oil-soluble copper compounds. The copper may be blended into the oil as any suitable oil soluble copper compound. By oil soluble it is meant that the compound is oil soluble under normal blending conditions in the oil or additive package. The copper compound may be in the cuprous or cupric form. The copper may be in the form of the copper dihydrocarbyl thio- or dithio-phosphates. Alternatively, the copper may be added as the copper salt of a synthetic or natural carboxylic acid. Examples of same this include $C_{10}$ to $C_{18}$ fatty acids, such as stearic or palmitic acid, but unsaturated acids such as oleic or branched carboxylic acids such as naphthenic acids of molecular weights of from about 200 to 500, or synthetic carboxylic acids, are preferred, because of the improved handling and solubility properties of the resulting copper carboxylates. Also useful are oil-soluble copper dithiocarbamates of the general formula $(RR,NCSS)nCu$ (where n is 1 or 2 and R and R, are the same or different hydrocarbyl radicals containing from 1 to 18, and preferably 2 to 12, carbon atoms, and including radicals such as alkyl, alkenyl, aryl, aralkyl, alkaryl and cycloaliphatic radicals. Particularly preferred as R and R, groups are alkyl groups of from 2 to 8 carbon atoms, Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R,) will generally be about 5 or greater. Copper sulphonates, phenates, and acetylacetonates may also be used.

Exemplary of useful copper compounds are copper CuI and/or CuII salts of alkenyl succinic acids or anhydrides. The salts themselves may be basic, neutral or acidic. They may be formed by reacting (a) polyalkylene succinimides (having polymer groups of Mn of 700 to 5,000) derived from polyalkylene-polyamines, which have at least one free carboxylic acid group, with (b) a reactive metal compound. Suitable reactive metal compounds include those such as cupric or cuprous hydroxides, oxides, acetates, borates, and carbonates or basic copper carbonate.

Examples of these metal salts are Cu salts of polyisobutenyl succinic anhydride, and Cu salts of polyisobutenyl succinic acid. Preferably, the selected metal employed is its divalent form, e.g., Cu+2. The preferred substrates are polyalkenyl succinic acids in which the alkenyl group has a molecular weight greater than about 700. The alkenyl group desirably has a Mn from about 900 to 1,400, and up to 2,500, with a Mn of about 950 being most preferred. Especially preferred is polyisobutylene succinic anhydride or acid. These materials may desirably be dissolved in a solvent, such as a mineral oil, and heated in the presence of a water solution (or slurry) of the metal bearing material. Heating may take place between 70, and about 200° C. Temperatures of 110° C. to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-polyisobutenyl succinic anhydride, Cu-oleate, or mixtures thereof) will be generally employed in an amount of from about 50 to 500 ppm by weight of the metal, in the final lubricating or fuel composition.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutyenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinimide acid and mixtures thereof; U.S. Pat. No. 3,879,306 which discloses N(hydroxyalkyl)alkenyl- succinimic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl)alkenyl succinimides. The disclosures of the above references are herein incorporated by reference. The most preferred friction modifiers are succinate esters, or metal salts thereof, of hydrocarbyl substituted succinic acids or anhydrides and thiobis-alkanols such as described in U.S. Pat. No. 4,344,853.

Dispersants maintain oil insolubles, resulting from oxidation during use, in suspension in the fluid thus preventing sludge flocculation and precipitation or deposition on metal parts. Suitable dispersants include high molecular weight alkyl succinimides, the reaction product of oil-soluble polyisobutylene succinic anhydride with ethylene amines such as tetraethylene pentamine and borated salts thereof.

Pour point depressants, otherwise known as lube oil flow improvers, lower the temperature at which the fluid will flow or can be poured. Such additives are well known. Typical of those additives which usefully optimize the low temperature fluidity of the fluid are $C_6$–$C_{18}$ dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representative of conventional antiwear agents are zinc dialkyldithiophosphate and zinc diaryldithiosphate.

Detergents and metal rust inhibitors include the metal salts of sulphonic acids, alkyl phenols, sulfurized alkyl phenols, alkyl salicylates, naphthenates and other oil soluble mono- and di-carboxylic acids. Highly basic (viz, overbased) metal salts, such as highly basic alkaline earth metal sulfonates (especially Ca and Mg salts) are frequently used as detergents. Representative examples of such materials, and their methods of preparation, are found in co-pending Ser. No. 754,001, filed Jul. 11, 1985, the disclosure of which is hereby incorporated by reference.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

| Additive | Wt. % a.i. (Broad) | Wt. % a.i. (Preferred) |
| --- | --- | --- |
| Viscosity Modifier | .01–12 | .01–4 |
| Corrosion Inhibitor | 0.01–5 | .01–1.5 |
| Oxidation Inhibitor | 0.01–5 | .01–1.5 |
| Dispersant | 0.1–20 | 0.1–10 |
| Pour Point Depressant | 0.01–5 | .01–1.5 |
| Anti-Foaming Agents | 0.001–3 | .001–0.10 |
| Anti-Wear Agents | 0.001–5 | .001–2.0 |
| Friction Modifiers | 0.01–5 | .01–1.5 |
| Detergents/Rust Inhibitors | .01–10 | .01–3 |
| Mineral Oil Base | Balance | Balance |

All of said weight percents expressed herein are based on active ingredient (a.i.) content of the additive, and/or upon the total weight of any additive-package, or formulation which will be the sum of the a.i. weight of each additive plus the weight of total oil or diluent.

The derivatized blend of this invention find its primary utility in lubricating oil compositions, which employ a base oil in which these copolymers are dissolved or dispersed.

Thus, base oils suitable for use in preparing the lubricating compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids such as automatic transmission fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarboxylic acids, polyglycols and alcohols; polyalpha-olefins, polybutenes, alkyl benzenes, organic esters of phosphoric acids, polysilicone oils, etc.

The derivatized blends are oil-soluble, dissolvable in oil with the aid of a suitable solvent, or are stably dispersible materials. Oil-soluble, dissolvable, or stably dispersible as that terminology is used herein does not necessarily indicate that the materials are soluble, dissolvable, miscible, or capable of being suspended in oil in all proportions. It does mean, however, that the additives, for instance, are soluble or stably dispersible in oil to an extent sufficient to exert their intended effect in the environment in which the oil is employed. Moreover, the additional incorporation of other additives may also permit incorporation of higher levels of a particular copolymer hereof, if desired.

Accordingly, while any effective amount, i.e., dispersant or viscosity index improving-dispersant effective amount, of the additives of the present invention can be incorporated into the fully formulated lubricating oil composition, it is contemplated that such effective amount be sufficient to provide said lube oil composition with an amount of the additive of typically from about 0.01 to about 10, preferably 0.1 to 6.0, and more preferably from 0.25 to 3.0 wt. percent, based on the weight of said composition.

In the case of each basestock, e.g., lubricating oil, which may be improved by the technique of this invention, it will be found that there is a characteristic model weight percent ethylene at which the low temperature performance e.g., pour point and results in slow cooled tests such as the mini-rotary viscometers (MRV TP-1) is at a maximum. Similarly, there is a characteristic model weight percent ethylene content at which the low temperature performance as measured by the cold cranking simulator test (CCS) is at a maximum. The multifunctional viscosity modifiers of the instant invention can be employed alone in lubricant compositions or can be employed in combination with other unfunctionalized viscosity modifiers or other multifunctional viscosity modifiers in order to obtain the best low temperature performance. The Examples that follow show how to best improve low temperature performance and the improvement over the prior art.

The above description are merely illustrative and are not intended to limit the scope of the invention. Additional reactions which can be used in the process of the invention will be readily apparent to those skilled in the art.

EXAMPLES

The following Examples I and II illustrate a useful embodiment of the present invention, in which grafting of a high ethylene, ethylene-propylene copolymer and a low ethylene, ethylene-propylene copolymer with maleic anhydride, initiated by thermal decomposition of peroxide is carried out in a first reaction zone of a twin screw counter rotating extruder. This is followed by imidization of the grafted copolymer with a primary amine in a second reaction zone.

For the reaction of the copolymer with maleic anhydride, LUPERSOL® 130 from Atochem North America is used as the initiator. It contains 90 to 95% by weight of 2,5-dimethyl-2,5-di(t-butylperoxy)hexyne-3 as the active ingredient.

The following ethylene-propylene copolymers were used:
ETHYLENE-PROPYLENE COPOLYMER A 43 wt. % ethylene, a number average molecular weight (Mn) of approximately 80,000, melt flow rate=14 grams/10 minutes, measured with a load of 10.0 kg at 230° C., Mooney viscosity, ML, 1+4, 125° C.=28, sold by Exxon Chemical Company, USA as VISTALON® 457.
ETHYLENE-PROPYLENE COPOLYMER B 70 wt. % ethylene, a number average molecular weight (Mn) of approximately 60,000, melt flow rate=12 grams/10 minutes, measured with a load of 2.16 kg at 230° C., Mooney viscosity, ML, 1+4, 125° C.=18, manufactured by Exxon Chemical Company, USA, as MDV 90-9.

For imidization of the grafted copolymers 4-(3-aminopropyl)morpholine, purchased from Texaco Chemical Company was the amine used. The amine compound contains one primary amine functional group and one tertiary amine functional group. When an imide is formed by reaction of the primary amine with grafted maleic anhydride, it will be evident to those skilled in the art that tertiary amine functionality is introduced into the polymer. By virtue of its reaction to form an imide, the basicity of the primary amine group is lost, but the tertiary amine, of course, remains basic and will react as a base, as for example with acids. For this reason the product imide, which is a polymer exhibiting the properties of a base, is useful in automotive lubricating oils. In this application the tertiary amine is thought to react with acidic species generated by oxidation of the oil during use and that by doing so, it reduces the precipitation of sludge in the parts, thereby contributing to desirable reduction of engine part wear. The polymeric nature of the imide also contributes to desirable modification of the viscosity of the lubricating oil. This type of product is generally referred to as a multifunctional viscosity modifier, recognizing that it performs more than one function when used as an automotive lubricating oil additive.

By reaction with this amine or similar amines both copolymer A and copolymer B give products useful as multifunctional viscosity modifiers. Those made from copolymer A have different formulated oil low temperature properties. This is a consequence of the lower degree of crystallinity of copolymer A which in turn results from the rough equivalence of the molar content of ethylene and propylene and consequent minimum in crystallinity for an ethylene-propylene random copolymer.

Example I

The ethylene-propylene copolymer A was fed from a drying extruder into the hopper of an extruder-reactor at a rate of 100 kg/hr. Water was also fed into the hopper at a rate of 100 g/hr. Liquified maleic anhydride was fed into the reactor at a rate of 1.95 kg/hr through an injection valve at about L/D=7. L/D is a term used to define distances along an extruder barrel relative to the ratio of extruder length to extruder barrel diameter. LUPERSOLS® 130 was fed at a rate of 80 g/hr through an injection valve at about L/D=17. The LUPERSOL® 130 was fed as a 50 wt. % solution in ISOPAR® V mineral oil. 4-( 3-aminopropyl)morpholine was fed into the second reactor zone at a rate of 3.9 kg/hr at about L/D=46. By products of the grafting step and amination step were removed via vent zones along the extruder. Temperature within the barrel was maintained at between 240° and 295° C.

Samples of the pelletized product (MFVM-A) were taken and dissolved 10 wt. % in an Esso solvent 130 neutral basestock to make a multifunctional viscosity modifier concentrate.

Example II

The ethylene-propylene copolymer B was fed from a drying extruder into the hopper of an extruder-reactor at a rate of 100 kg/hr. Water was also fed into the hopper at a rate of 100 g/hr. Liquified maleic anhydride was fed into the reactor at a rate of 1.65 kg/hr through an injection valve at about L/D=7. LUPERSOL® 130 was fed at a rate of 125 g/hr through an injection valve at about L/D=17. The LUPERSOL® 130 was fed as a 50 wt. % solution in ISOPAR® V mineral oil. 4-(3-aminopropyl)morpholine was fed into the second reactor zone at a rate of 3.8 kg/hr at about L/D=46. By products of the grafting step and amination step were removed via vent zones along the extruder. Temperature within the barrel was maintained at between 295° and 305° C.

Samples of the pelletized product (MFVM-B) were taken and dissolved 10 wt. % in an Esso solvent 130 neutral basestock to make a multifunctional viscosity modifier concentrate.

Esso 10W40 lubricating oil formulations were prepared using the concentrates of MFVM-A and MFVM-B. In addition, formulations were prepared using mixtures of the concentrates of MFVM-A and MFVM-B (e.g. 90 wt. % MFVM-A/10 wt. % MFVM-B, 80 wt. % MFVM-A/20 wt. % MFVM-B etc.)

The formulated oils contain 9% of an experimental detergent inhibitor package comprising: a conventional commercially available dispersant, detergent inhibitor, antioxidant, antiwear agent and diluent; commercially available Esso solvent neutral 140 and 130 basestocks; (75.4 wt. % and approximately 4.5% respectively) and ECA-11039 Lube Oil Flow Improver (0.4 wt. %). ECA-11039 is commercially available and manufactured by Exxon Chemical Company. The formulated oil basestock ratios and kinematic viscosity were held constant.

Figure 2:
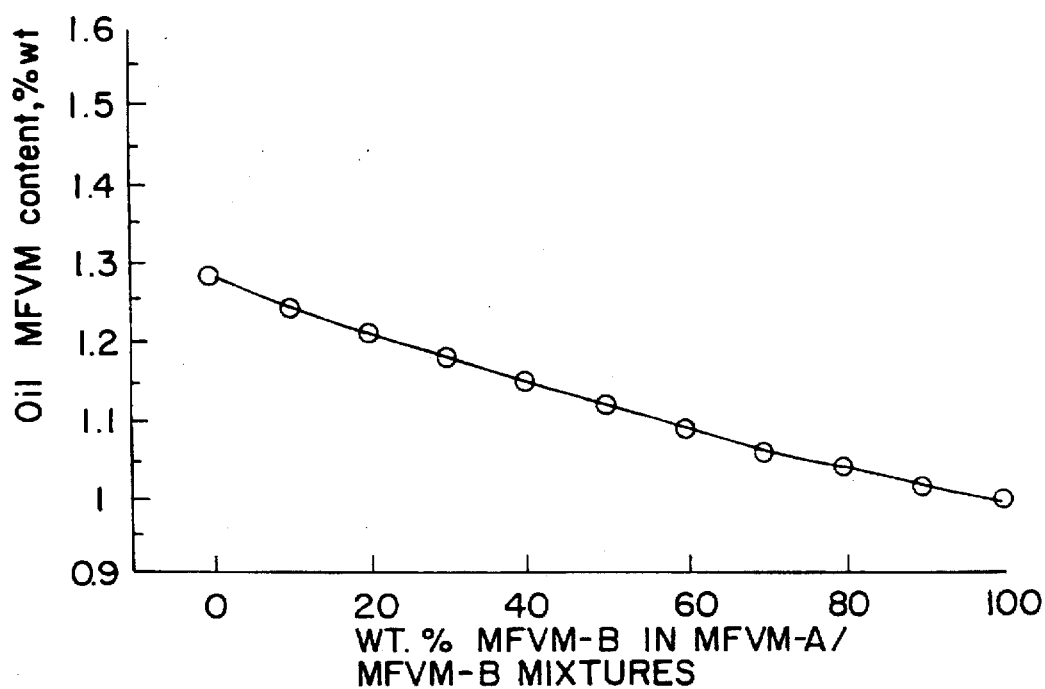
FIG. 2 illustrates the multifunctional viscosity modifier content in 10W40 fully formulated oils, meeting the oil kinematic viscosity target.

The data in FIGS. 1 and 2 show the properties of the Esso 10W40 lubricating oils containing the various amounts of MFVM-A and MFVM-B.

FIG. 1 shows the results of the cold cranking simulator test (CCS ASTM test method D-2602) which is a measure of the lubricant oil dynamic viscosity at a low temperature (−20° C.). These results show preferably lower CCS values with the use of MFVM-B relative to MFVM-A.

FIG. 2 shows that a lower content of MFVM-B, relative to MFVM-A, is needed to thicken the lubricating oil to the 10W40 Kinematic viscosity range of 12.5–16.3 cST at 100° C.

Based on the results reported in FIGS. 1 and 2, a lubricating oil containing all MFVM-B would be preferred.

Figure 3A:
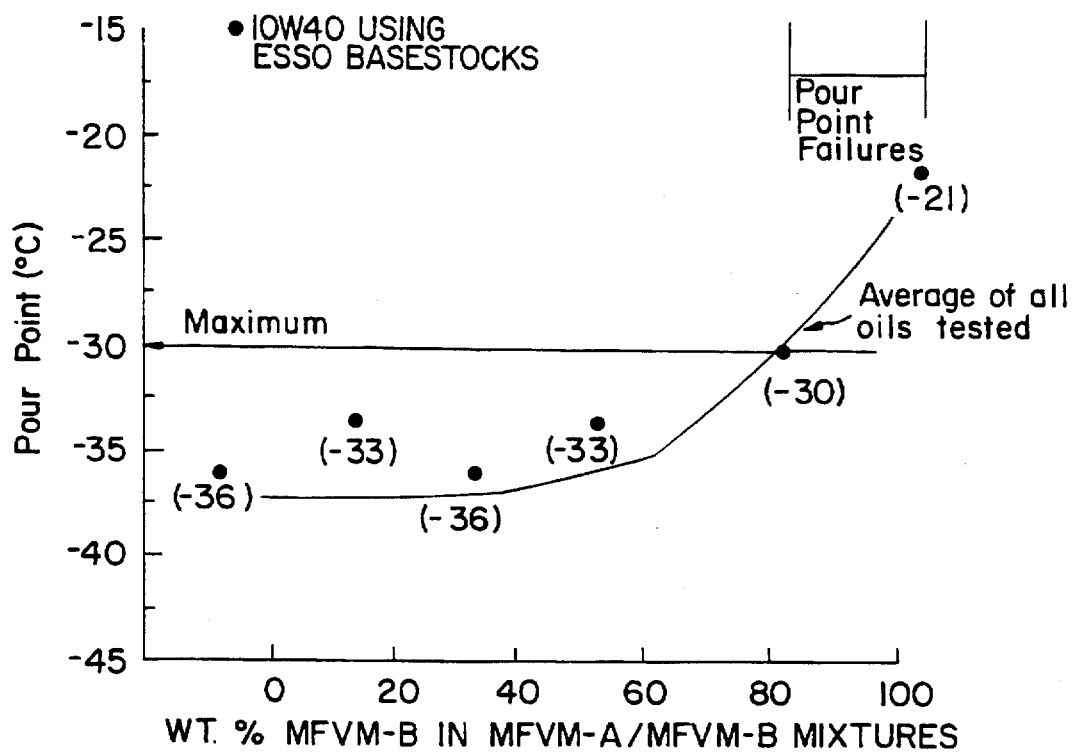
FIGS. 3A and 3B illustrate multifunctional viscosity modifiers blended into a variety of 10W40 fully formulated oils and the performance of the oils in the Pour Point and Mini Rotary Viscometer test.
Figure 3B:
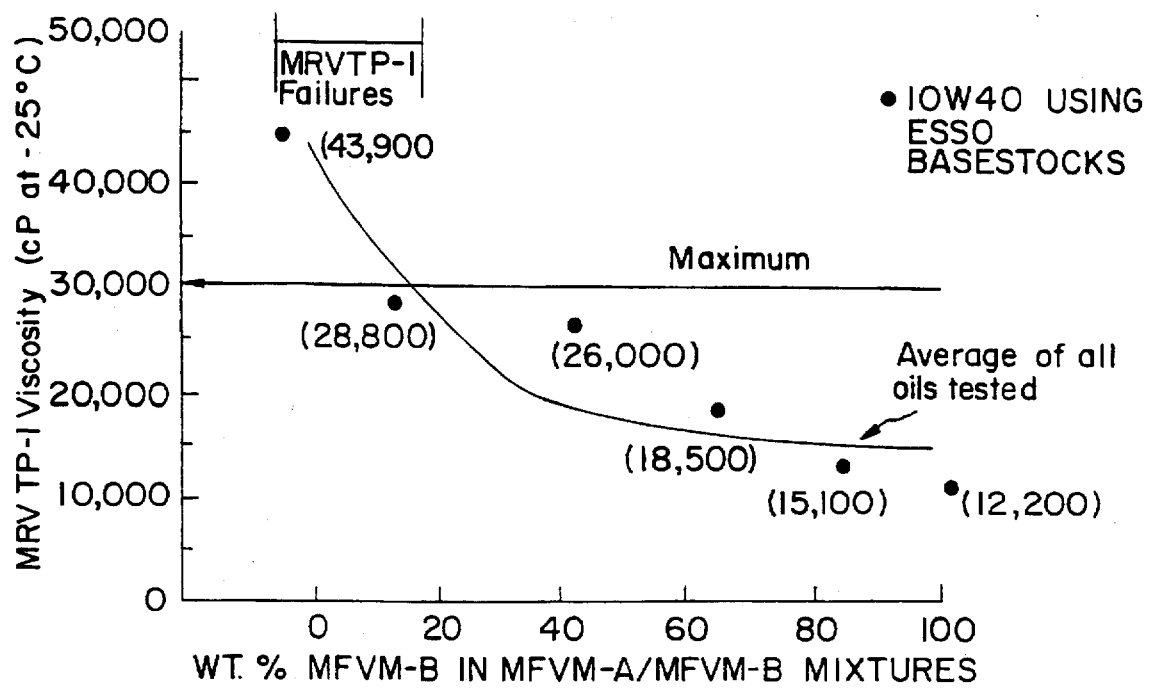

However, FIG. 3 shows the viscometric performance of MFVM-A, MFVM-B and mixtures thereof in the Esso 10W40 oils. These data show that MFVM-B alone fails pour point (ASTM test method D-97) while MFVM-A alone passes. FIG. 3 also shows results on the slow cooled dynamic viscosity test using the mini rotary viscometer apparatus (MRV-TP1). In this test the formulated oil samples are slow cooled through a standard cycle and test run at a low temperature, e.g. −25° C. (ASTM Test Method D-4684 TP-1 cooling profile).

In this test MFVM-A alone fails and MFVM-B alone passes.

Hence using these testing criteria neither MFVM-A or MFVM-B alone meet the desired performance standards. FIG. 3 also shows the average viscometric performance of MFVM-A and MFVM-B in a variety of other 10W40 formulated oils.

These data confirm that neither MFVM-A or MFVM-B alone meet the performance targets in all commercially available basestocks.

It has been surprisingly found that by mixing MFVM-A and MFVM-B, as also shown by the data in FIG. 3, that the pour point targets and MRV TP-1 targets can be met.

Furthermore, the use of MFVM-B in the mixture allows one to take advantage of the lower MFVM content credit and CCS benefit described above, associated with its use.

For example a 60 wt. %/40 wt. % of MFVM-B/MFVM-A as shown on FIG. 3, would pass both pour point and MRV-TP-1 and still shows a credit in CCS and total MFVM content.

Example III

A 45/55 wt. % mixture of Copolymer A and Copolymer B was prepared first, then functionalized and derivatized in an extruder reactor in substantially the same was as copolymers A and B were in Examples I and II. Samples of the pelletized product were dissolved in an amount equal to 9.8 wt. % in an Exxon solvent 100 neutral basestock to make a multifunctional viscosity modifier concentrate. A second concentrate was made also containing 3 wt. % of a borated 950 molecular weight polyisobutylene succinimide dispersant—ECA-5025. ECA-5025 is a commercially available product manufactured by Exxon Chemical Company. The kinematic viscosity at 100° C. of both concentrate samples stored at 80° C. was measured initially after 1 week, after 2 weeks, and every 2 weeks thereafter for a total duration of 8 weeks.

As the data in FIG. 4 show the concentrate containing the multifunctional viscosity modifier alone (base case) showed a substantial viscosity increase. The sample containing the multifunctional viscosity modifier plus 3 wt. % dispersant exhibited a substantially lower viscosity growth than the base case.

What is claimed is:

1. Multifunctional viscosity index improver composition comprising a mixture of derivatized ethylene-alpha olefin Copolymer A and derivatized ethylene-alpha olefin Copolymer B, said A and B derivatized copolymers being:
   (a) present in said mixture at a blend weight ratio of A:B of from about 2.3:1 to about 0.18:1, and (b) derived from copolymer having a number average molecular weight of from about 20,000 to about 100,000 and wherein:
   A. derivatized Copolymer A comprises the adduct of:
      (i) ethylene-alpha olefin copolymer comprising from about 30 to about 60 weight percent monomer units derived from ethylene and from about 70 to about 40 weight percent monomer units derived from alpha olefin, functionalized with mono- or dicarboxylic acid material; and
      (ii) at least one nucleophilic amine; and
   B. derivatized Copolymer B comprises the adduct of:
      (i) ethylene-alpha olefin copolymer, comprising from about 60 to about 80 weight percent monomer units derived from ethylene and from about 40 to about 20 weight percent monomer units derived from alpha olefin, functionalized with mono- or dicarboxylic acid material; and
      (ii) at least one nucleophilic amine; with the proviso that the respective weight percents of ethylene derived monomer units present in said A and B derivatized copolymers differs by at least 5 weight percent.

2. The composition of claim 1, wherein said A and B derivatized copolymers are derived from copolymer functionalized with mono- or dicarboxylic acid material derived from at least one monounsaturated carboxylic reactant selected from the group consisting of
   (i) monounsaturated $C_4$ to $C_{10}$ dicarboxylic acids wherein (a) the carboxyl groups are attached to adjacent carbon atoms and (b) at least one of said adjacent carbons is part of said monounsaturation;
   (ii) anhydrides of (i);
   (iii) monounsaturated $C_3$ to $C_{10}$ monocarboxylic acids wherein the carbon-carbon double bond is allylic to the carboxy group.

3. The composition of claim 2, wherein the dicarboxylic acid material is succinic anhydride.

4. The composition of claim 1, wherein (1) derivatized Copolymer A contains from about 40 to about 50 weight percent monomer units derived from ethylene (2) derivatized Copolymer B contains from about 65 to about 75 weight percent monomer units derived from ethylene, and (3) the A:B blend ratio is from about 1.2:1 to about 0.25:1.

5. The composition of any one of claims 1 to 4 further comprising oil.

6. The composition of any one of claims 1 to 4, wherein said mixture is in the configuration of a solid pellet.

7. The composition of any one of claims 1 to 4, wherein said alpha olefin is propylene.

8. The composition of any one of claims 1 to 4, wherein the nucleophilic amine is selected from the group consisting of alkylene polyamine, hydrocarbyl diamine containing one primary amine group and one tertiary amine groups hydrocarbyl diamine containing one primary amine and one secondary amine group, amino-aromatic polyamine, amino alcohols, and mixtures thereof.

9. The composition of claim 8, wherein the amine is selected from the group consisting of N-aminoethylpiperazine and N-aminopropylphenothiazine.

10. The composition of claim 1, which further comprises a molecular weight growth regulator comprising hydrocarbyl substituted succinic anhydride.

11. The composition of claim 1, which is post-treated with a capping agent comprising $C_{12}$ to $C_{16}$ hydrocarbyl substituted succinic anhydride.

12. The composition of any one of claims 1 to 4, wherein said mixture is dissolved in oil containing a lube oil flow improver.

13. The composition of claim 12, wherein the lube oil flow improver comprises a mixture of (a) at least one low molecular weight polymer of unsaturated carboxy ester represented by the formula:

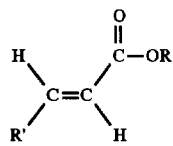
(I)

wherein R' is selected from the group consisting of hydrogen and COOR and wherein R is a $C_{14}$ alkyl group and (b) low molecular weight copolymer of the carboxy ester of formula (I), and vinyl ester represented by the formula:

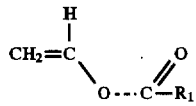
(II)

wherein $R_1$ comprises an alkyl group containing from 1 to 18 carbon atoms, and (C) at least one low molecular weight non-ethylene containing polymer or interpolymer containing pendent ester groups, having repeating methylene unit derived from a mixture of alcohols present within the structure of said pendant ester groups; the weight ratio of said component (C) to the total weight of (a)+(b) in said composition varying from about 1:0.3 to about 1:0.9.

14. The composition of claim 12, wherein said lubricating oil flow improver comprises the mixture of (a) a low molecular weight polymer of unsaturated carboxy ester having the formula:

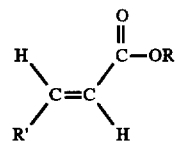
(I)

wherein R' is selected from the group consisting of hydrogen and COOR and wherein R is a $C_{14}$ alkyl group; and (b) low molecular weight copolymer of the carboxy ester of formula (I), and vinyl ester represented by the formula:

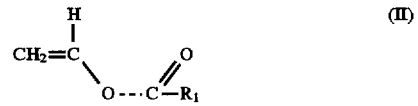
(II)

wherein $R_1$ comprises an alkyl group containing from 1 to 18 carbon atoms.

15. The composition of any one of claims 1 to 4, 10, or 11, which further comprises oil and ashless dispersant.

16. A composition comprising a mixture of from about 70 to about 15 wt. percent Component A and from about 85 to about 30 wt. percent of Component B based on the mixture weight and wherein Component A comprises ethylene alpha olefin copolymer having a number average molecular weight of from about 20,000 to about 100,000 and comprising from about 40 to about 60 weight percent monomer units derived from ethylene, and from about 60 to about 40 wt. percent monomer units derived from α-olefin, functionalized with mono- or dicarboxylic acid material and Component B comprises ethylene alpha olefin copolymer having a number average molecular weight of from about 20,000 to about 100,000 and comprising from about 60 to about 80 weight percent monomer units derived from ethylene and from about 20 to about 40 wt. percent monomer units derived from α-olefin, functionalized with mono- or dicarboxylic acid material with the proviso that the respective weight percent of ethylene derived monomer units percent in said A and B copolymers differs by at least 5 weight percent.

17. The composition of claim 16, wherein the α-olefin is propylene.

18. The composition of claim 16, wherein said mixture is in the configuration of a solid pellet.

19. The composition as recited in claim 16, wherein said mixture is dissolved in oil.

* * * * *